United States Patent [19]
Fujimoto

[11] Patent Number: 4,811,552
[45] Date of Patent: Mar. 14, 1989

[54] PROPELLING DRIVE TRANSMISSION STRUCTURE FOR WALKING OPERATOR TYPE LAWN MOWER

[75] Inventor: Satoshi Fujimoto, Sakai, Japan

[73] Assignee: Kubota Ltd., Osaka, Japan

[21] Appl. No.: 118,688

[22] Filed: Nov. 9, 1987

[30] Foreign Application Priority Data

Nov. 10, 1986 [JP] Japan .................. 61-267180
Dec. 16, 1986 [JP] Japan .................. 61-193831[U]
Dec. 17, 1986 [JP] Japan .................. 61-194688[U]

[51] Int. Cl.[4] .................................. A01D 34/74
[52] U.S. Cl. .................................. 56/11.8; 56/17.2; 56/16.9; 74/417; 464/139
[58] Field of Search ............ 56/16.9, 17.1, 17.2, 56/10.7, 11.4, 255, 17.5, 11.8 R; 180/19.3; 74/417 X; 464/139 X

[56] References Cited

U.S. PATENT DOCUMENTS

| | | | |
|---|---|---|---|
| 3,014,546 | 12/1961 | Banka | 56/11.8 |
| 4,183,229 | 1/1980 | Johansson | 464/139 |
| 4,212,364 | 7/1980 | Dobberpuhl | 56/17.2 |
| 4,554,780 | 11/1985 | Umeno et al. | 56/17.2 |
| 4,582,503 | 4/1986 | Sherman | 464/139 |
| 4,716,717 | 1/1988 | Ogano | 56/11.8 |

Primary Examiner—John Weiss
Attorney, Agent, or Firm—Jordan and Hamburg

[57] ABSTRACT

A propelling drive transmission structure for a walking operator type lawn mower having vertically adjustable front and rear wheels and a main frame supporting a cutting blade housing between the front and rear wheels. The transmission structure comprises a change speed device disposed above a rear axle for changing speed of engine drive for transmission to the rear axle. The change speed device includes an output shaft operatively connected to the rear axle through a rotary shaft and bevel gears. The rotary shaft is slidable relative to the output shaft to vary spacing between the output shaft and the rear axle.

4 Claims, 13 Drawing Sheets

PROPELLING DRIVE TRANSMISSION STRUCTURE FOR WALKING OPERATOR TYPE LAWN MOWER

BACKGROUND OF THE INVENTION

The present invention relates to a propelling drive transmission structure for a walking operator type lawn mower having a main frame supporting a cutting blade housing, and particularly to a transmission structure comprising a vertically adjustable drive axle disposed rearwardly of the blade housing, an engine disposed above the blade housing for driving the drive axle, and a change speed device for effecting change speed on the drive axle.

This type of lawn mower is capable of cutting grass at a selected height by vertically adjusting the drive axle.

One such lawn mower is disclosed in Japanese Utility Model Publication (Kokai) No. 60-157282. In this known construction, the change speed device is operatively connected to the drive axle by a transmission belt. A variation in spacing between the change speed device and the drive axle resulting from a vertical adjustment of the drive axle is absorbed by a flexion of the transmission belt. The change speed device is disposed at a higher level than the blade housing, thereby to minimize the length of a transmission line from the engine to the change speed device and to minimize influences of the vertical adjustment of the drive axle.

The above conventional construction, however, has room for improvement in that drive transmission may be impaired by grass clippings. For example, grass clippings scattering in the course of a grass cutting operation tend to adhere to the belt and cause slips between the belt and pulleys.

SUMMARY OF THE INVENTION

The object of the present invention is to mitigate the above trouble of drive transmission caused by grass clippings while retaining the above-noted advantage of the transmission line from the engine to the change speed device.

In order to achieve this object, a propelling drive transmission structure according to the present invention comprises a vertically adjustable drive axle disposed rearwardly of the blade housing, an engine disposed above the blade housing for driving the drive axle, and a change speed device for effecting change speed on the drive axle, wherein the change speed device is disposed above the drive axle and at a higher level than the blade housing, the change speed device including output means operatively connected to input means of the drive axle through a rotary shaft movable to vary spacing between the output means and the input means.

Where the change speed device is fixed, or substantially fixed to be capable of only slight movements, to a position at a higher level than the blade housing, a variation in spacing between the change speed device and the drive axle resulting from a vertical adjustment of the drive axle is aborbed by the rotary shaft having a connection spacing varying function. Further, the rotary shaft is less vulnerable to the adhesion of grass clippings than the transmission belt in transmitting the drive to the drive axle.

Thus, the rotary shaft capable of absorbing the variation in spacing permits the change speed device to be fixed, or substantially fixed, to a position at a higher level than the blade housing. As a result, the transmission line from the engine to the change speed device is simple and compact which provides advantages in economy and in designing.

Moreover, since the rotary shaft is less vulnerable to the adhesion of grass clippings than the transmission belt, the likelihood of drive transmission error and other trouble is reduced and the transmission system now has a less chance of breakdown.

Other features and advantages of the present invention will be apparent from the following description.

DESCRIPTION OF THE PREFERRED EMBODIMENTS

Figure 1:
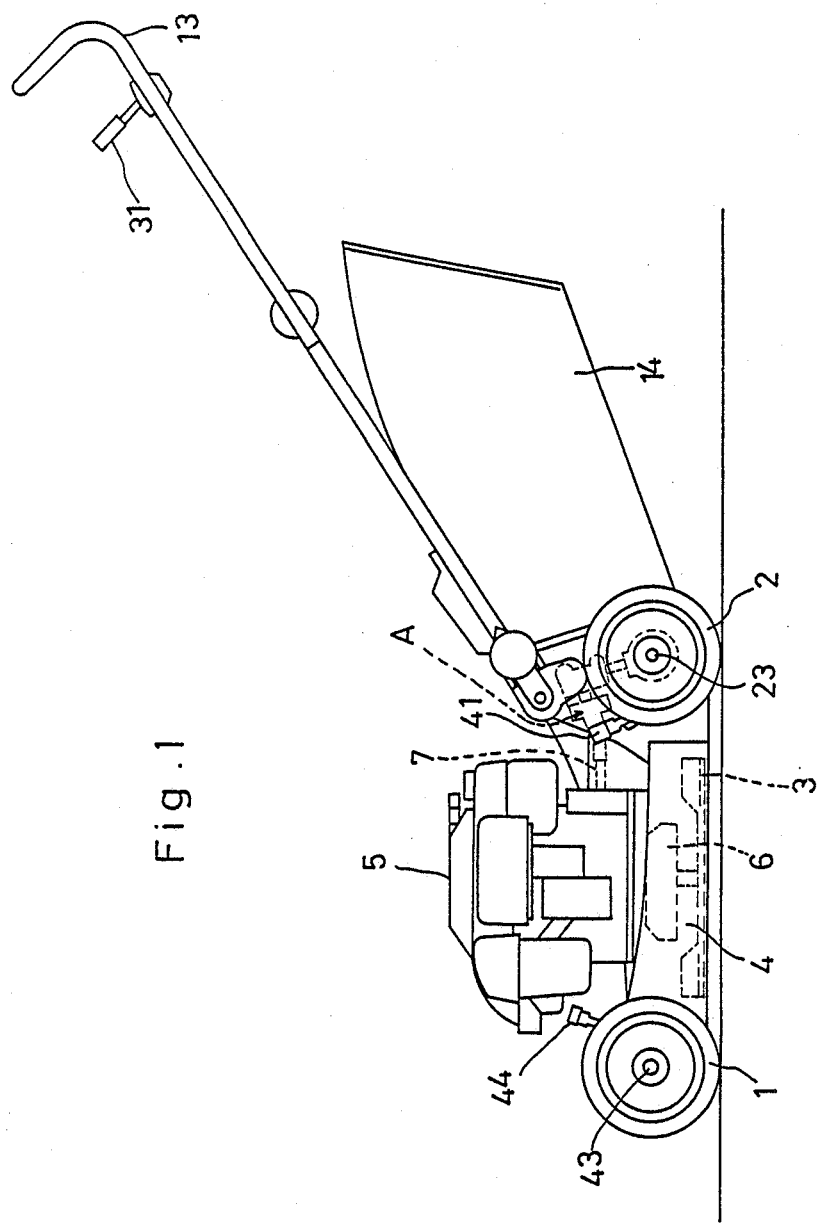
FIG. 1 is a side elevation of a walking operator type lawn mower.

FIG. 1 is a side elevation of a lawn mower of the type controlled by a walking operator. The lawn mower comprises, at lower positions of a main frame, right and left front wheels 1, right and left rear drive wheels 2, and a blade housing 4 containing a cutting blade 3 rotatable on a vertical axis. An engine 5 is mounted above the blade housing 4. Part of the output of engine 5 is transmitted to the cutting blade 3 through a cutter clutch 6, and part of the engine output is transmitted to the rear wheels 2 through a transmission shaft 7 and a frictional stepless change speed mechanism 8 to be described later. The lawn mower further comprises a steering handle 13 and a grass collecting container 14 rearwardly of the main frame. Grass cut by the cutting blade 3 is delivered to the container 14 through a duct communicating with the blade housing 4.

Figure 2:
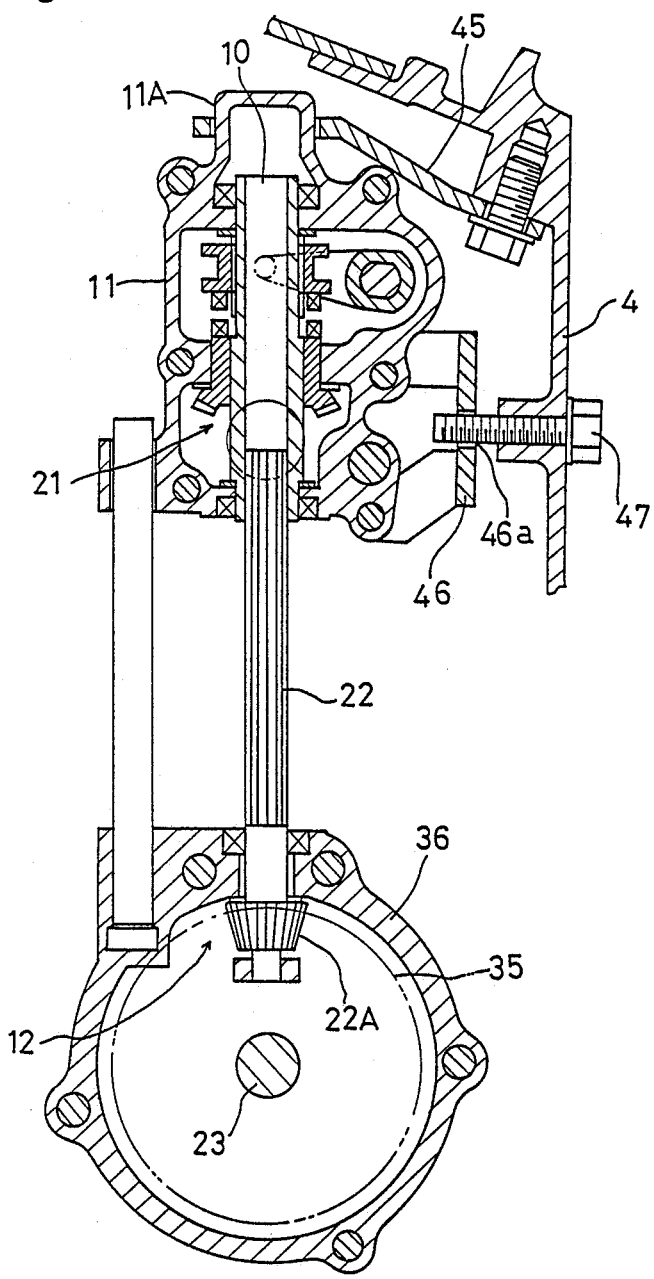
FIG. 2 is a side view in vertical section of a transmission structure for drive wheels.
Figure 3:
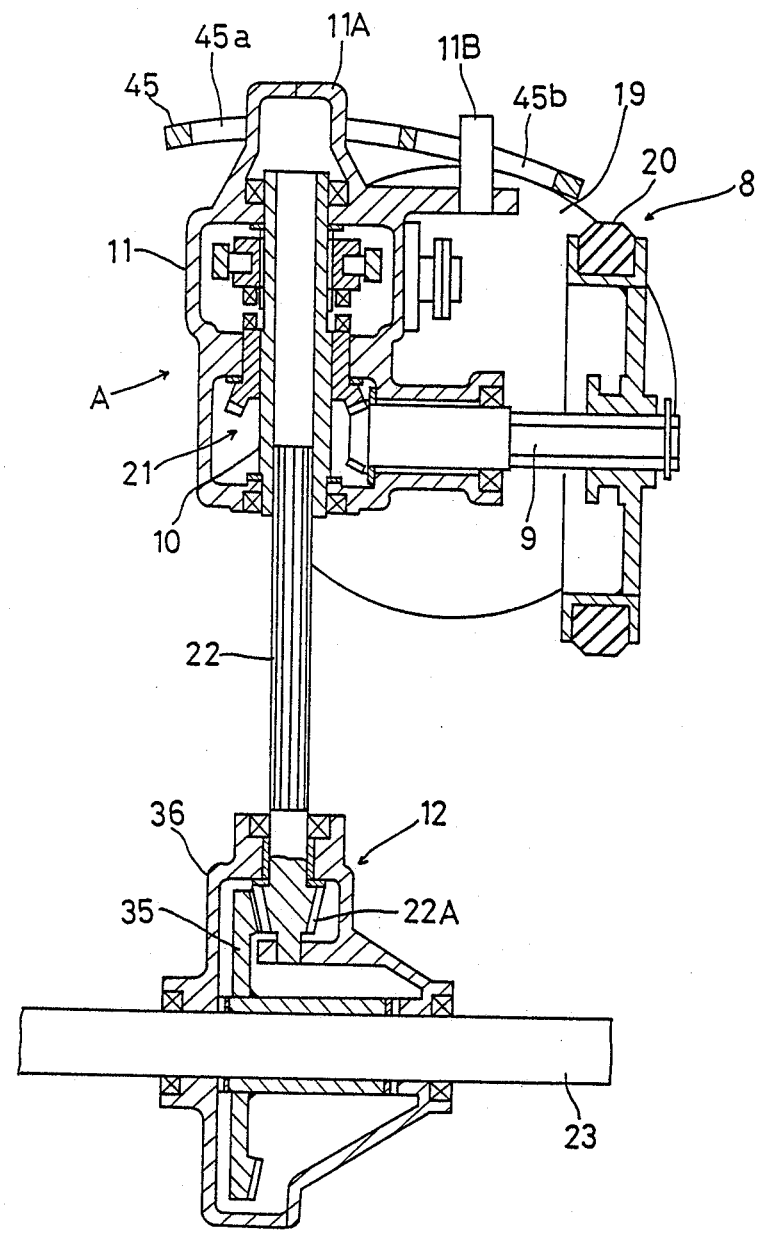
FIG. 3 is a rear view in vertical section of the transmission structure.
Figure 4:
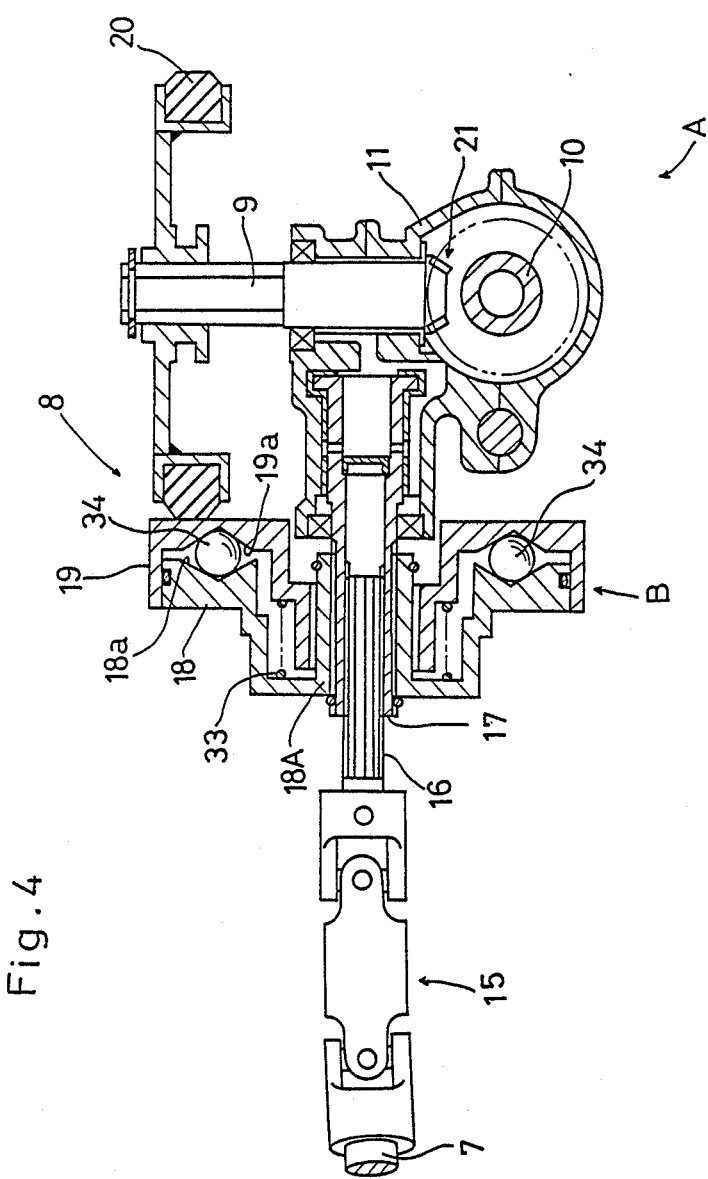
FIG. 4 is a plan view in cross section of a propelling drive transmission structure.
Figure 5:
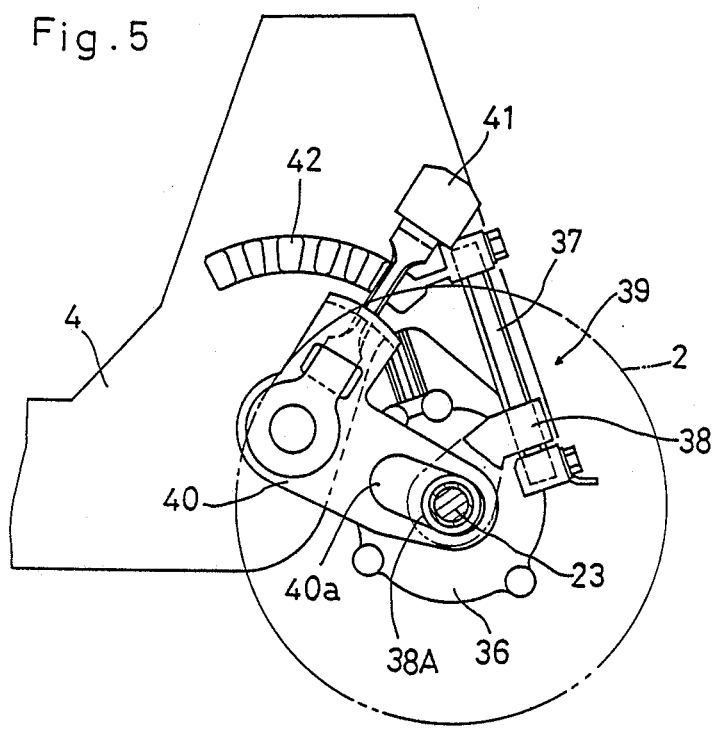
FIGS. 5 and 6 are side views, partly broken away, of a structure for raising and lowering the drive wheels, respectively.
Figure 6:
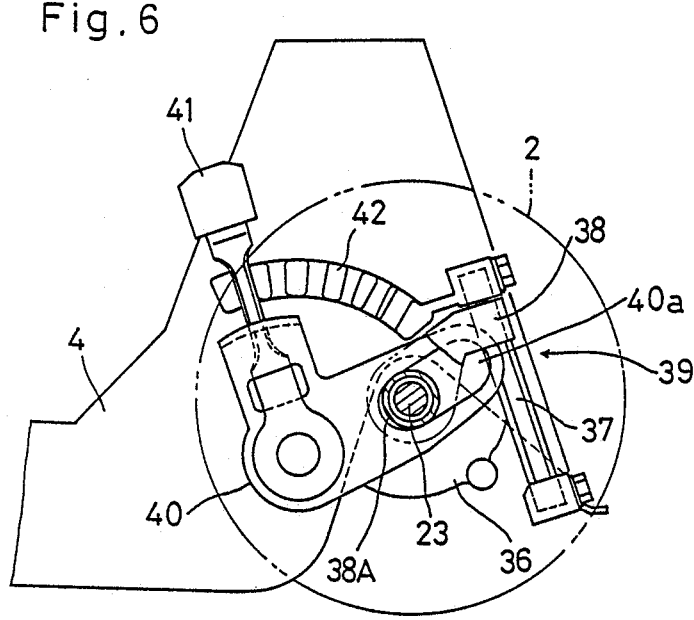
Figure 7:
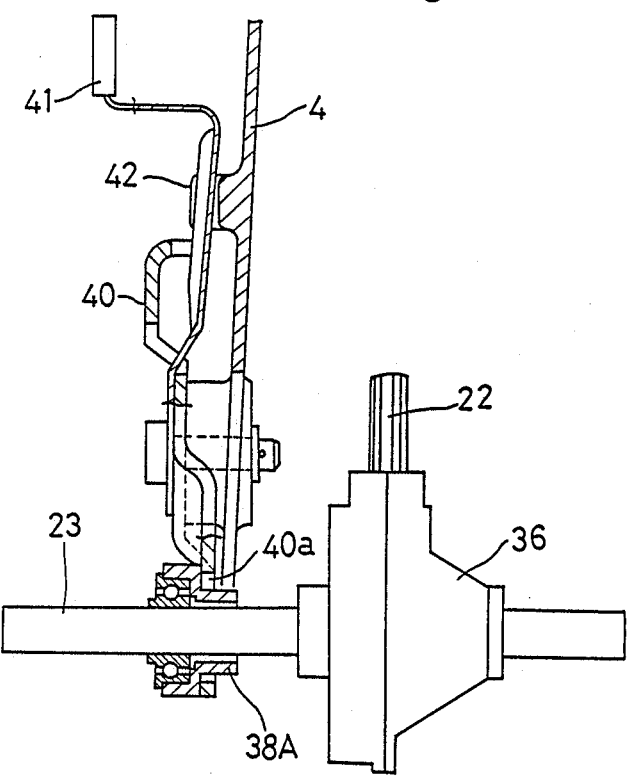
FIG. 7 is a rear view in vertical section of a control lever mounting structure.
Figure 8:
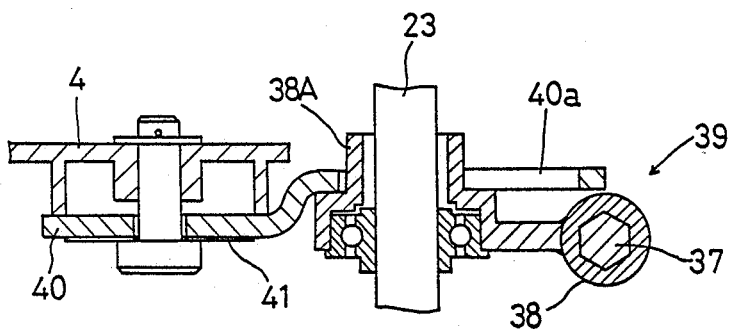
FIG. 8 is a view in cross section of a drive axle rocking structure.
Figure 9:
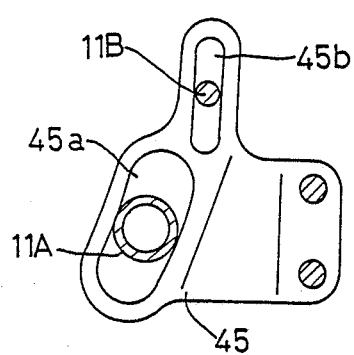
FIGS. 9 and 10 are views showing the shape of a bracket for guiding oscillations of an output transmission.
Figure 10:
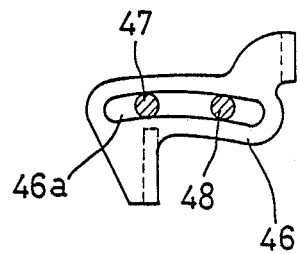

Referring to FIGS. 2 through 4, a drive axle 23 of the rear wheels 2 is driven by a change speed device A including the frictional stepless change speed mechanism 8, a first output shaft 9 for outputting drive of the stepless change speed mechanism 8, a second output shaft 10 having an axis extending perpendicular to an axis of the first output shaft 9, and an output transmission 11 supporting the first output shaft 9. The change speed device A is disposed upwardly of the drive axle 23 and at a higher level than the blade housing 4.

Details of the change speed device A will be described next. As seen from FIG. 4, the transmission shaft 7 is connected to an input shaft 16 through a universal joint 15. A drive rotation member 18 is mounted for unitary rotation on the input shaft 16 through a sleeve shaft 17. The rotation member 18 includes a boss 18A carrying a drive disk 19 rotatable with the rotation member 18 through a cam mechanism B. The first output shaft 9 carries a driven disk 20 mounted to be rotatable with and slidable along the first output shaft 9. The driven disk 20 has an outer periphery in contact with a side face of the drive disk 19, and is slidable relative to the drive disk 19. These elements constitute the frictional stepless change speed mechanism 8. The first output shaft 9 is operatively connected to the second output shaft 10 through a bevel gear mechanism 21, the second output shaft 10 being a tubular shaft supported by the output transmission 11. A third output shaft 22 is fitted in the second output shaft 10 to be rotatable therewith. The third output shaft 22 is operatively connected to the drive axle 23 through a bevel gear mechanism 12. Thus, an output in different speeds of the stepless change speed mechanism 8 is transmitted through the first output shaft 9, second output shaft 10, third output shaft 22 and bevel gear mechanism 12 to the drive axle 23 to drive the rear wheels 2.

The front wheels 1 and rear wheels 2 are vertically adjustable relative to the main frame so that grass may be cut at a selected height. A structure for allowing this adjustment will be described next. As shown in FIGS. 2 and 3, the second output shaft 10 acting as output member of the change speed device A receives therein the third output shaft 22 acting as a rotary shaft extending upward from the bevel gear mechanism 12 acting as input section of the drive axle 23. The second and third output shafts 10 and 22 are rotatable with and slidable relative to each other. The third output shaft 22 includes a bevel gear 22A, and the drive axle 23 includes a bevel gear 35 rotatable therewith. The two bevel gears 22A and 35 are meshed with each other and housed in a transmission case 36 of the bevel gear mechanism 12. Thus, spacing between the second output shaft 10 and the bevel gear mechanism 12 is variable by sliding the third output shaft 22 relative to the second output shaft 10, thereby to vertically adjust the drive axle 23.

A construction for sliding the third output shaft 22 will be described with reference to FIGS. 5 through 8. This construction comprises a pair of right and left guide mechanisms 39 each including a guide rod 37 and a guide member 38. The guide rod 37 is fixed to the main frame and extends vertically to permit vertical movements of the drive axle 23 relative to the main frame. The guide member 38 is mounted at one end thereof on the guide rod 37 to be only slidable relative thereto, and mounted at the other end on the drive axle 23 to be rotatable relative thereto. The guide member 38 includes a boss 38A disposed in a slot 40a defined in an axle support member 40, whereby the boss 38A is movable in the fore and aft direction of the main frame. A control lever 41 is connected to the axle support member 40 for causing the axle support member 40 to pivot vertically relative to the main frame, which causes the boss 38A of the guide member 38 to move along the slot 40a. As a result, the drive axle 23 is moved vertically to adjust the height of the rear wheels 2. The rear wheels 2 are lockable to a selected height by placing each lever 41 into engagement with a corresponding lever guide 42 attached to the main frame.

The front wheels 1 are vertically adjustable by means of control levers 44 shown in FIG. 1. These levers are fixed to a front axle 43 supporting the front wheels 1 for free rotation.

When the rear wheels 2 are vertically adjusted one after the other, the main frame becomes inclined relative to the drive axle 23 since the latter comprises only one axle. This would apply a bending stress between the second output shaft 10 and third output shaft 22. In order to avoid such a stress, means is provided to allow the output transmission 11 to change its posture relative to the main frame as will be described now with reference to FIGS. 2, 3, 9 and 10. The output transmission 11 includes a pair of upper bosses 11A and 11B extending through arcuate slots 45a and 45b defined in a bracket 45 bolted to the main frame, respectively. Further, a bracket 46 bolted to the output transmission 11 from behind defines an arcuate slot 46a penetrated by a pair of bolts 47 and 48 fixed to the main frame. Thus, when one of the rear wheels 2 is vertically adjusted, an inclination of the main frame results in a movement of the bosses 11A and 11B along the slots 45a and 45b and a movement of the bracket 46 which is enabled by the slot 46a. Consequently, the output transmission 11 inclines in an opposite direction to the inclination of the main frame. In this way the output transmission 11 is constantly maintained in a fixed position with respect to the drive axis 23 thereby to eliminate possibility of the bending stress being applied between the second output shaft 10 and third output shaft 22.

Figure 11:
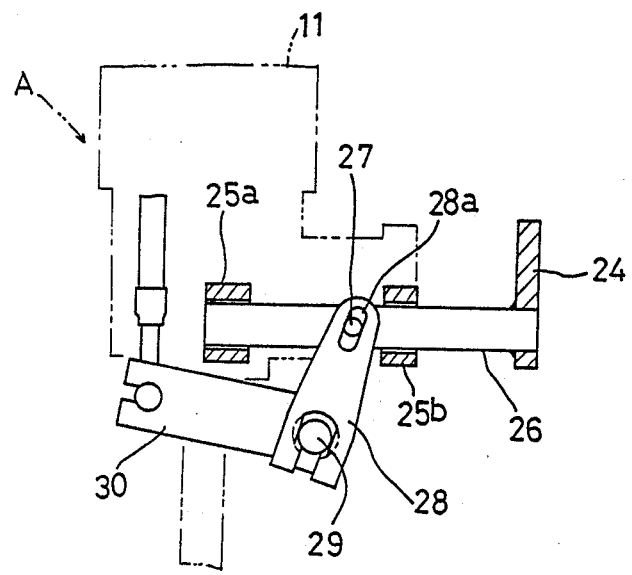
FIG. 11 is a rear view of a shift fork support structure.
Figure 12:
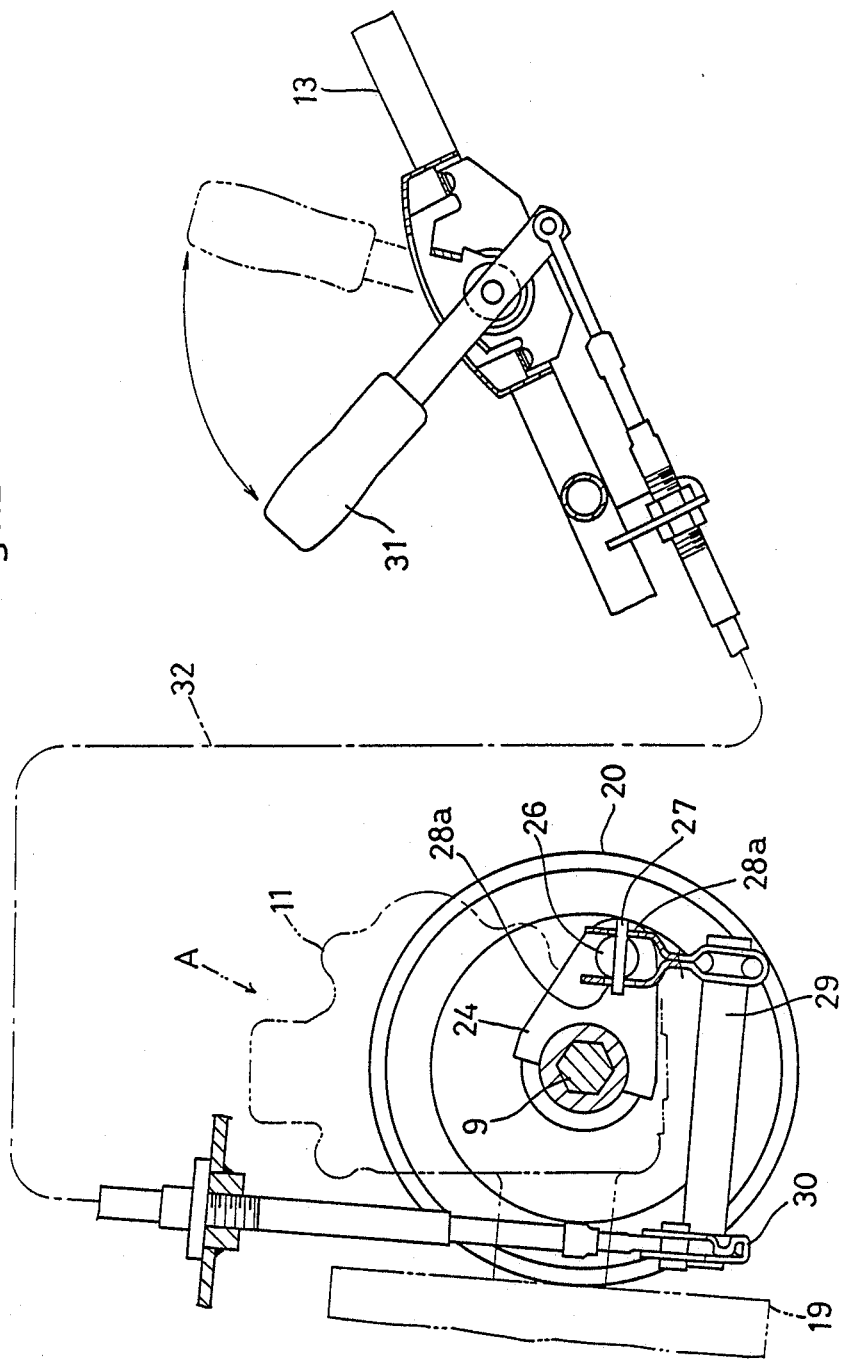
FIG. 12 is a schematic view of a change speed control structure.

A construction for sliding the driven disk 20 will be described with reference to FIGS. 11 and 12. The driven disk 20 is slidable along the first output shaft 9 by a shift fork 24 fixed to a shift fork shaft 26 slidably supported in bosses 25a and 25b provided on a rear wall of the output transmission 11. The shift fork shaft 26 is penetrated by a pin 27 having opposite ends thereof engaging slots 28a defined in a bifurcate, first oscillatable arm 28. The first oscillatable arm 28 is fixed to one end of a support shaft 29 supported at a lower end of the output transmission 11 and extending in the fore and aft direction of the main frame. A second oscillatable arm 30 is fixed to the other end of the support shaft 29. The second oscillatable arm 30 is connected through a push-pull wire 32 to a control lever 31 attached to the steering handle 13. An operation of the control lever 31 oscillates the second oscillatable arm 30 and rotates the support shaft 29. The rotation of support shaft 29 oscillates the first oscillatable arm 28, which slides the shift fork shaft 26. The shift fork shaft 26 then slides the driven disk 20 radially of the drive disk 19 to effect a change speed operation.

The cam mechanism B includes a spring 33 for biasing the drive disk 19 into initial pressure contact with the driven disk 20, to allow a relative rotation between the drive rotation member 18 and the drive disk 19. The drive rotation member 18 and the drive disk 19 each define a plurality of V-grooves 18a or 19a arranged in the peripheral direction on an inside face thereof. A plurality of balls 34 are disposed between opposed pairs of grooves 18a and 19a, respectively. Each groove 18a of the drive rotation member 18 shallows downwardly with respect to a direction of rotation. Thus, the greater a drive load of the driven disk 20 in rotation is, the more downwardly the balls 34 automatically move with respect to the direction of rotation, thereby increasing a pressing force of the drive disk 19 against the driven disk 20.

In the foregoing embodiment the rotary shaft 22 is slidably connected to the second output shaft 10. Instead, this rotary shaft 22 may be slidably connected to the bevel gear mechanism 12 acting as input section of the drive axle 23.

Another embodiment of the invention will be described next with reference to FIGS. 13 through 16. Like references are affixed to like elements in this and the preceding embodiments, and these elements will not be particularly described.

Figure 15:
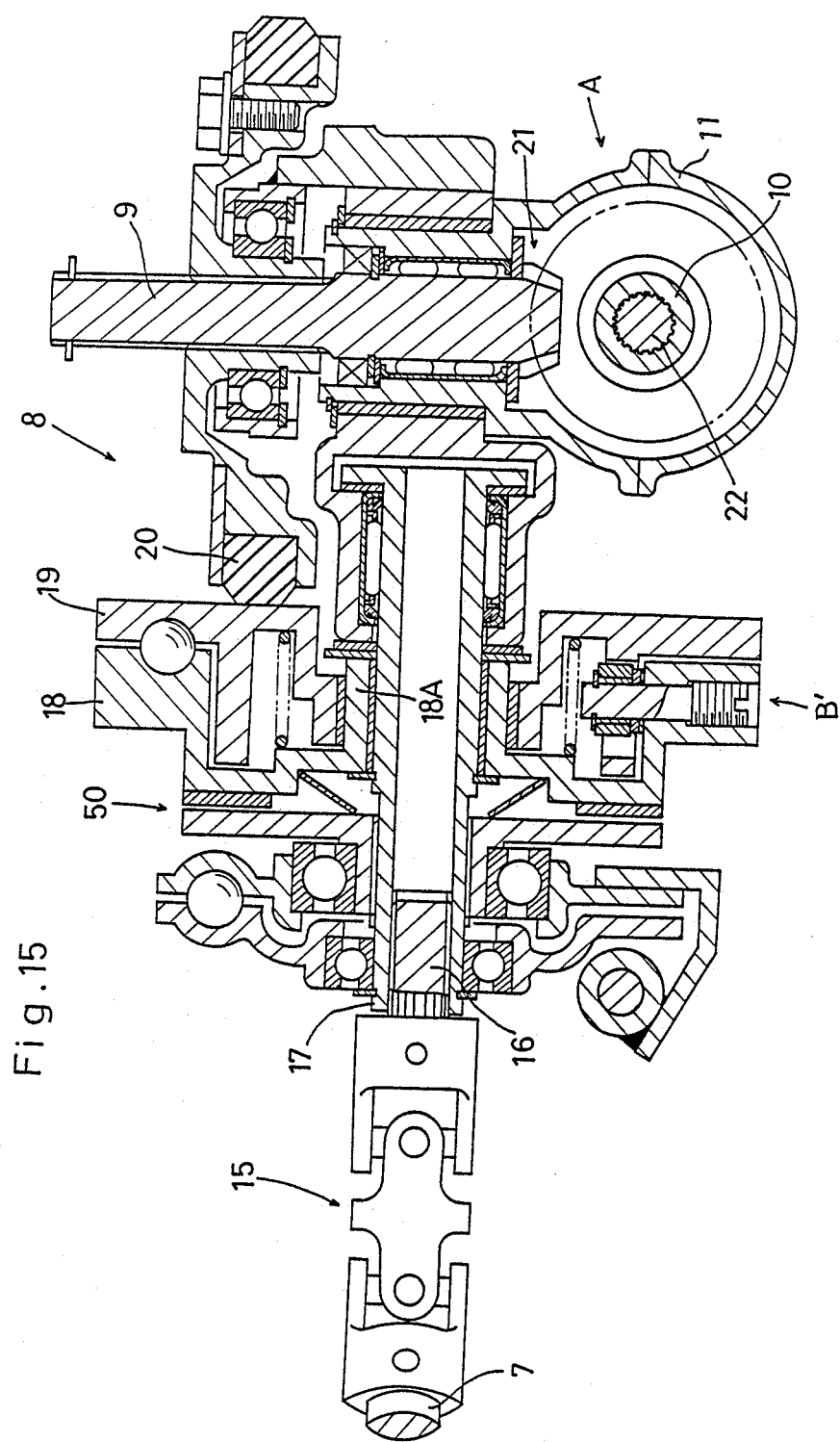
FIG. 15 is a cross section of a transmission structure upstream of a frictional stepless change speed mechanism in the embodiment of FIG. 13.

Referring to FIG. 15, as in the preceding embodiment, the transmission shaft 7 is connected through the universal joint 15 to the input shaft 16 on which the sleeve shaft 17 is mounted to be rotatable therewith. In this embodiment, the drive rotation member 18 rotatable with the sleeve shaft 17 is not directly mounted thereon but through a disk type friction clutch 50. In the preceding embodiment, the drive rotation member 18 is operatively connected to the drive disk 19 by the cam mechanism B. In this embodiment, the drive rotation member 18 and the drive disk 19 are rotatable with each other through an interlocking mechanism B' different in construction from the cam mechanism B. The frictional stepless chage speed mechanism 8 including the drive disk 19 and the driven disk 20 slidable relative thereto, and the change speed device A are the same as in the preceding embodiment. The output in different speeds of the stepless change speed mechanism 8 is transmitted to the drive axle 23 through the first output shaft 9, bevel gear mechanism 21, second output shaft 10, third output shaft 22, and bevel gear mechanism 12. In this embodiment, an engaging mechanism C is interposed between the bevel gear mechanism 12 and the drive axle 23.

Figure 13:
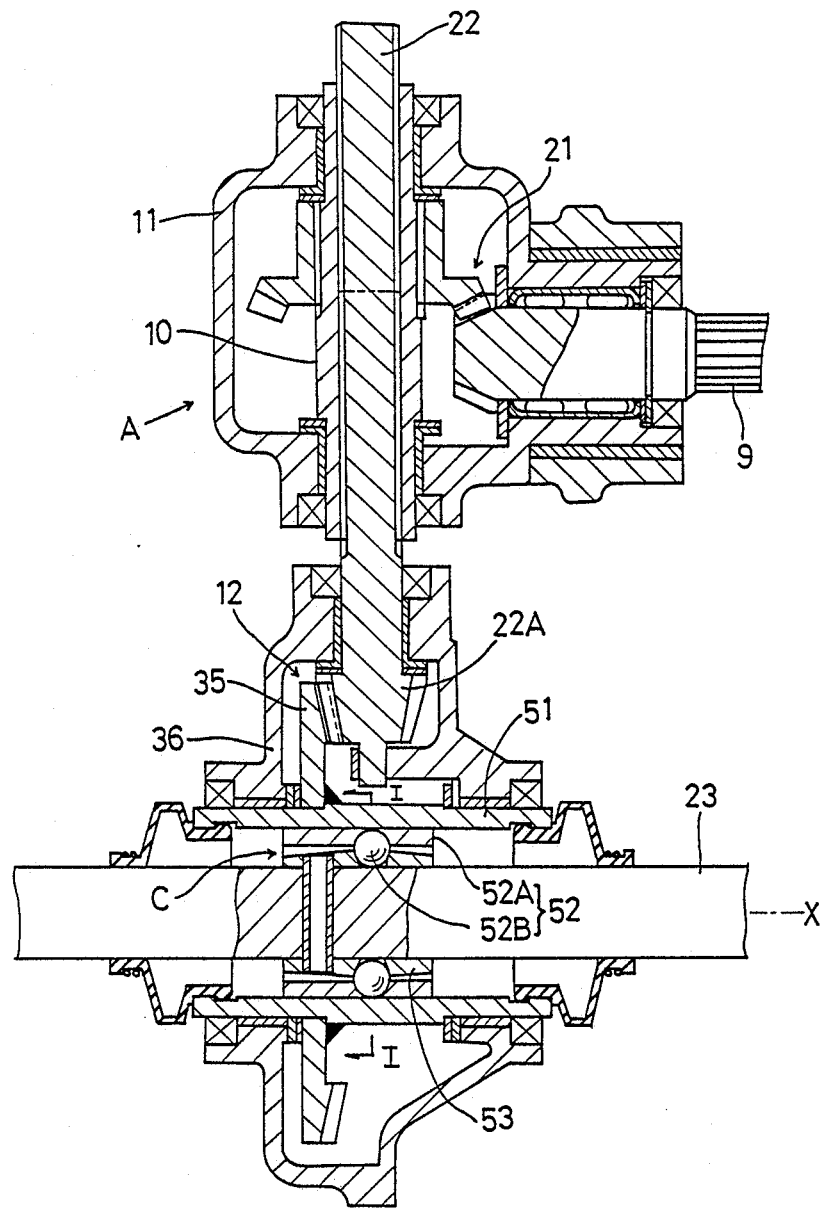
FIG. 13 is a rear view in vertical section of a transmission structure for rear wheels according to another embodiment.
Figure 14:
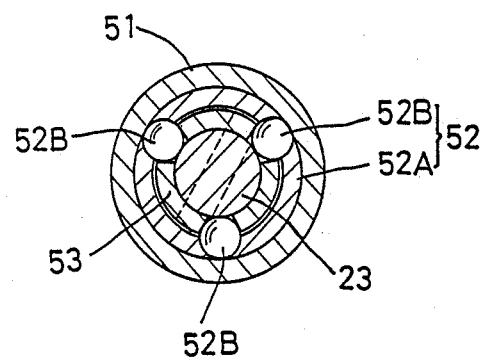
FIG. 14 is a section taken on line I—I of FIG. 13.
Figure 16:
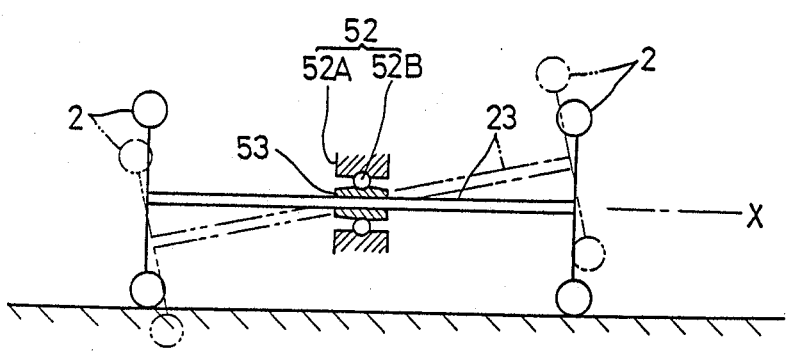
FIG. 16 is a schematic explanatory view showing an inclination of a drive axle.

As shown in FIGS. 13 and 14, the engaging mechanism C includes projections 52 provided inside a tubular rotary member 51 to be rotatable therewith, the rotary member 51 being fixed to the bevel gear 35 forming part of the bevel gear mechanism 12, and a recess 53 rotatable with the drive axle 23 and receiving the projections 52. The projections 52 consist of a ring-like element 52A fixed to the inside of rotary member 51, and three balls 52B arranged inside and peripherally of the ring-like element 52A. This engaging mechanism C connects the drive axle 23 to the rotary member 51 for unitary rotation while permitting the drive axle 23 to tilt relative to a rotational axis X of the rotary member 51. Thus, as shown in FIG. 16, the drive axle 23 is tiltable transversely of the main frame for slant cutting of lawn or other purposes. The tilt of the drive axle 23 is absorbed by the engaging mechanism C to prevent the third output shaft 22 from inclining relative to the second output shaft 10.

In the preceding embodiment, the output transmission 11 is variable in posture relative to the main frame in order to avoid a bending stress applied between the second output shaft 10 and third output shaft 22 when the rear wheels 2 are vertically adjusted one after the other or when slant cutting of lawn is carred out. This tends to complicate the construction. The present embodiment employing the engaging mechanism C allows the output transmission 11 to be fixed to the main frame. This relatively simple construction is effective to avoid the bending stress occurring between the second output shaft 10 and third output shaft 22, which has an advantage in terms of economy as well.

Figure 17:
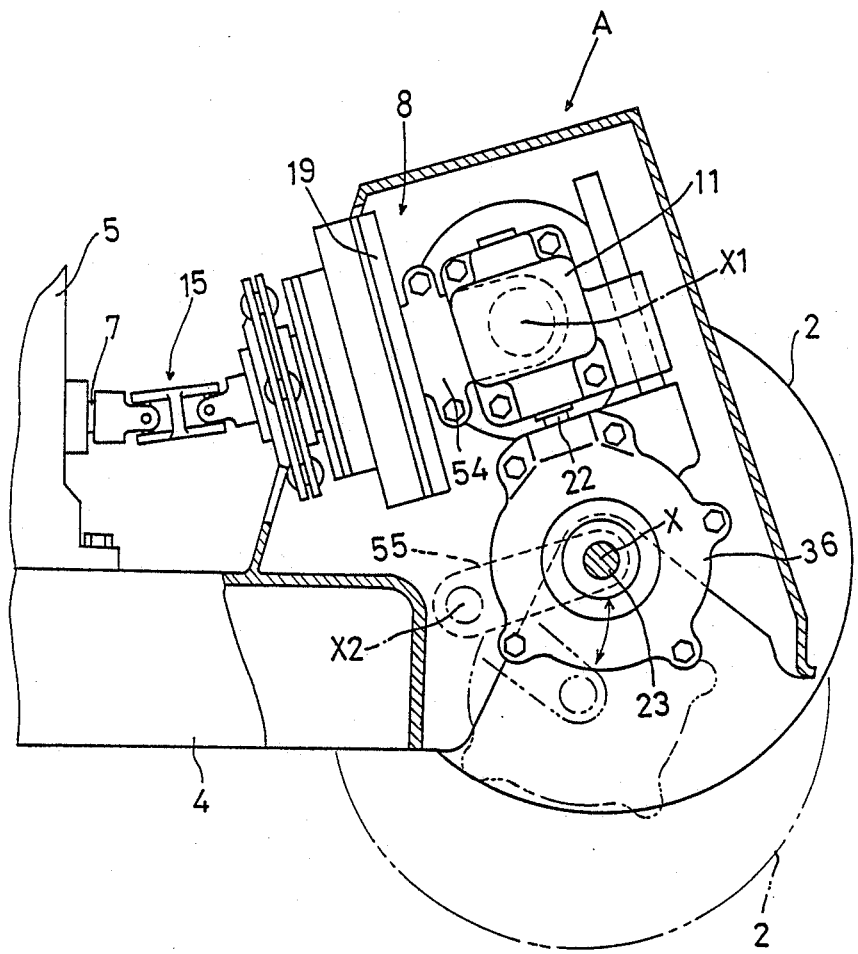
FIG. 17 is a side view of a structure adjacent rear wheels according to a further embodiment.
Figure 18:
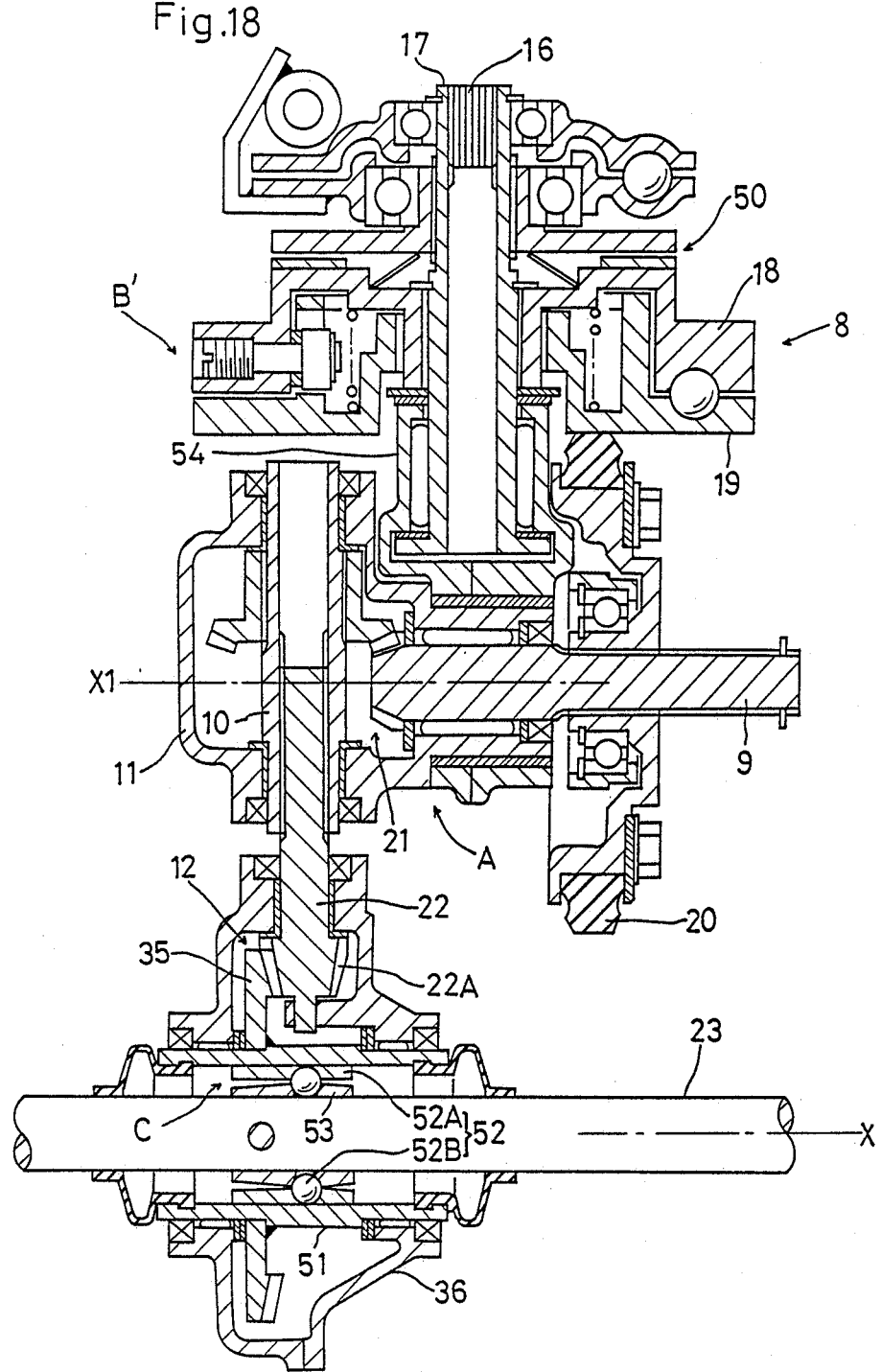
FIG. 18 is a rear view in vertical section of a transmission structure for driving a drive axle in the embodiment of FIG. 17.

A further embodiment will be described next with reference to FIGS. 17 and 18. This embodiment is similar in construction to the embodiment shown in FIGS. 13 through 16. Again, like numerals are affixed to like elements, and these elements will not be particularly described.

This third embodiment differs from the second embodiment primarily in that the output transmission 11 is attached to a casing 54 of the stepless change speed mechanism 8 to be oscillatable on an axis X1 of the first output shaft 9. Further, this embodiment includes right and left support arms 55 oscillatable on an axis X2 extending transversely of the blade housing 4 to be lockable to selected positions, with the drive axle 23 supported at right and left ends thereof by free ends of the support arms 55, respectively. When the right and left support arms 55 are vertically oscillated, the transmission case 36 supporting the drive axle 23 oscillates about the transverse axis X2 whereby the rear wheels 2 are vertically adjusted. With the oscillation the transmission case 36 moves in the fore and aft direction. As the transmission case oscillates about the transverse axis X2 of the support arm 55, the output transmission 11 also oscillates about the axis X1 of the first output shaft 9. This absorbs a displacement between the output transmission 11 and the transmission case 36 caused by the movement of the transmission case 36 in the fore and aft direction. Consequently, the third output shaft 22 is extended or retracted without trouble.

With the lawn mower, grass clippings and other matters tend to adhere to bottom parts of the machine during a grass cutting operation. Where the construction shown in FIGS. 5 through 8 is employed for vertically adjusting the rear wheels 2, such grass clippings and other matters could be caught in the slots 40a of the axle support members 40 to present a resistance to the sliding movement in the slots 40a of the bosses 38A of guide members 38. This renders the vertical adjustment of the rear wheels 2 hard work. The third embodiment does not include such slots, and always allows the rear wheels 2 to be vertically adjusted with ease.

I claim:

1. A propelling drive transmission structure for a walking operator type lawn mower having a cutting blade on a blade axis substantially centrally longitudinally of the mower, cutting blade housing means for housing the cutting blade, and an engine mounted above the cuting blade housing means and having a power output, the propelling drive transmission structure comprising:

(a) drive wheel means including:
an axle mounted rearwardly of the cutting blade and having a power input section, the axle being vertically pivotable for adjusting the height of the mower from the ground and laterally pivotable about a pivot point located substantially in the transverse center of the mower, and wheels mounted on opposite ends of the axle,
(b) a change speed mechanism for changing the speed of the power output from the engine and transmitting the changed speed power output to a power output section thereof, the change speed mechanism being fixed to the mower above said axle at a higher position than the cutting blade housing means, and
(c) rotary shaft means comprising a telescope structure, the rotary shaft means being operatively connected between said power output section and the power input section of the drive wheel means to vary a space therebetween.

2. A transmission structure as claimed in claim 1 further comprising a rotary member pivotable on an axis extending transversely of the main frame and penetrated by the axle, projections on one of the rotary member and the axle, and a recess on the other of the rotary member and the axle to receive the projections, whereby the axle is pivotable with the rotary member while being tiltable relative to the axis of the rotary member.

3. A transmission structure as claimed in claim 2 wherein the projections comprise a ring-like element fixed to an inside wall of the rotary member and balls arranged inside and peripherally of the ring-like element.

4. A transmission structure as claimed in claim 2 further comprising a transmission case housing the axle, a pair of right and left support arms pivotable on an axis extending transversely of the main frame for supporting right and left portions of the axle projecting from the transmission case, and an output transmission disposed above the transmission case to be pivotable about an axis extending parallel to the transversely extending axis, the rotary shaft means extending between the output transmission and the transmission case.

* * * * *